UNITED STATES PATENT OFFICE.

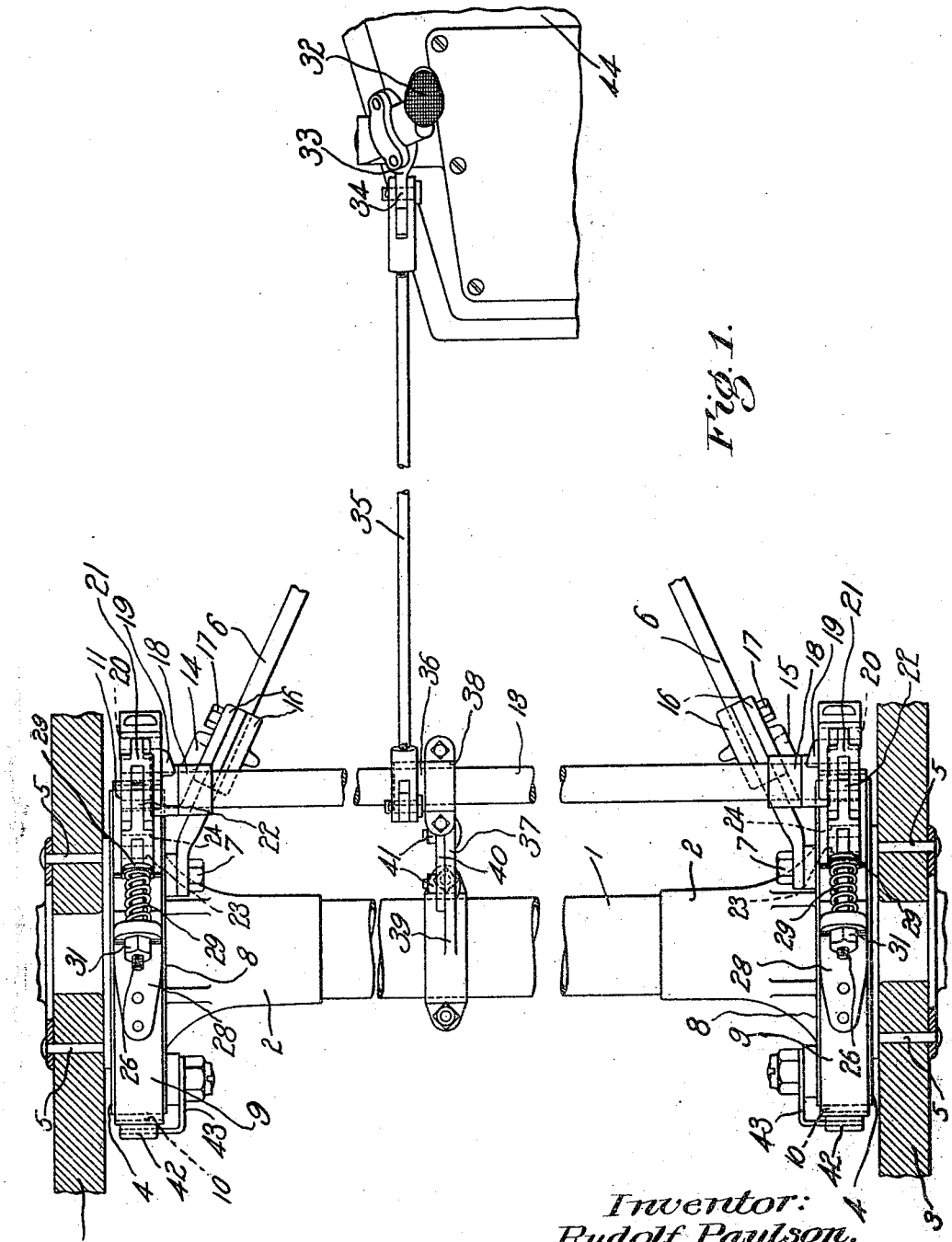

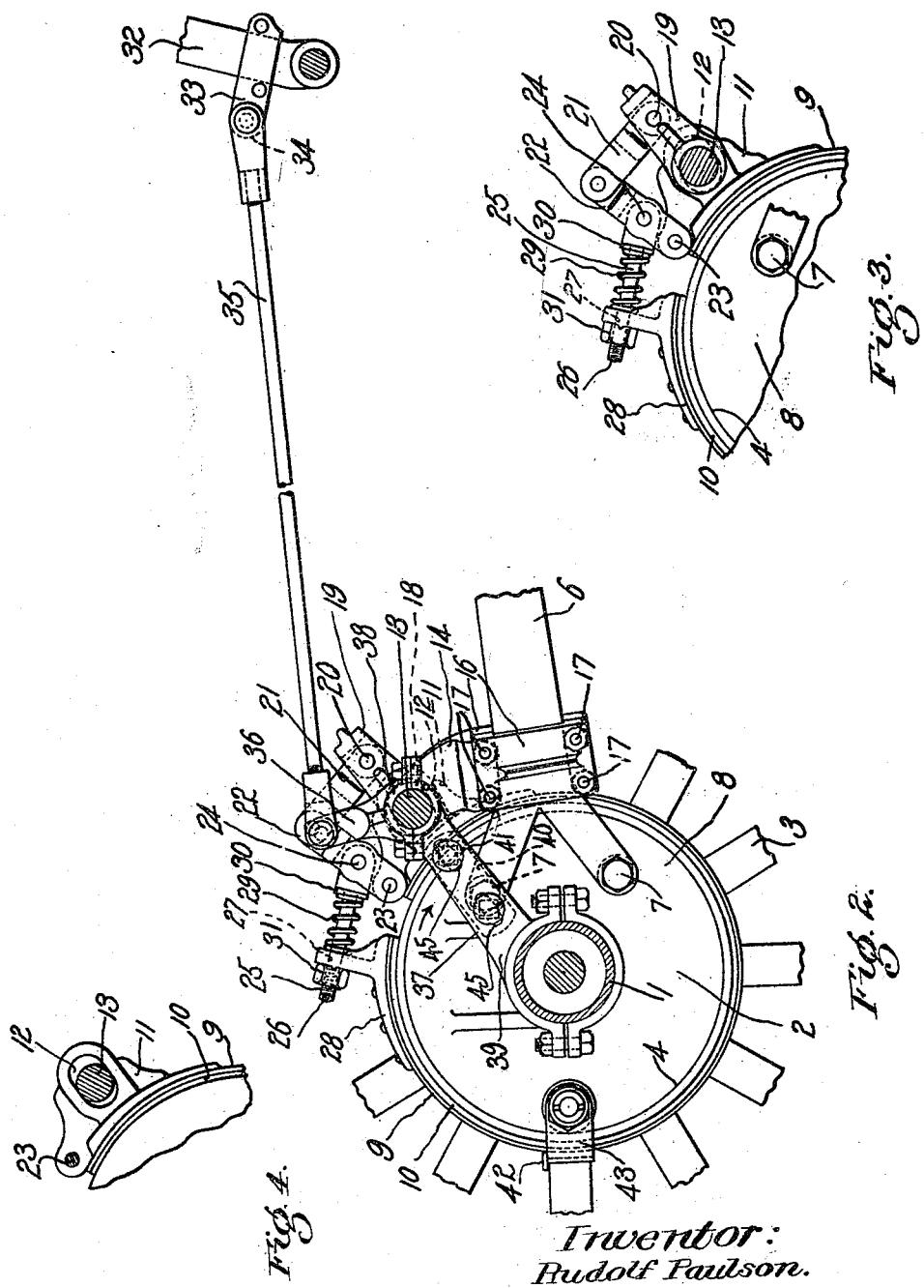

RUDOLF PAULSON, OF FOXBORO, MASSACHUSETTS.

BRAKE.

1,259,771.

Specification of Letters Patent. Patented Mar. 19, 1918.

Application filed August 27, 1917. Serial No. 188,512.

*To all whom it may concern:*

Be it known that I, RUDOLF PAULSON, a citizen of the United States, residing at Foxboro, in the county of Norfolk and State of Massachusetts, have invented new and useful Improvements in Brakes, of which the following is a specification.

This invention relates to improvements in brakes for motor vehicles and is particularly, though not exclusively, adapted for use in connection with the type of motor vehicle known as the Ford.

The object of the invention is to provide a powerful and durable brake adapted to be operated upon drums attached to the rear wheels of the vehicle from means disposed adjacent the operator's seat.

Another object of the invention is to provide a device of the nature described adapted to be quickly and easily applied to either new or old machines.

The invention consists in the combination and arrangement of parts set forth in the following specification and particularly pointed out in the claims.

Referring to the drawings:

Figure 1 is a plan view of portions of a motor vehicle, namely, the rear axle and the portion of the engine casing to which the brake mechanism is connected.

Fig. 2 is a vertical section through the rear axle of the motor vehicle with the brake mechanism for one wheel and its operating means shown in elevation.

Fig. 3 is a detail side elevation of the brake band contracting means.

Fig. 4 is a detail view of the brake band support.

Like numerals refer to like parts throughout the several views of the drawings.

In the drawings, 1 represents the rear axle mechanism of a motor vehicle, preferably of the type known as the Ford automobile, portions of said mechanism being broken away to save space in the drawings. The present adaptation of the invention is to the type of vehicle embodying a rear axle housing 2 which is a hollow frame incasing the moving parts of the rear axle. This housing extends from one rear wheel to the other, which are indicated in part at 3, 3. Each of the wheels 3 is provided with a brake drum 4 secured by bolts 5 to said wheel. The housing 2 is braced by radius rods 6, 6 which are secured by screws 7, 7 to disks 8, 8 at opposite ends of said housing, said radius rods extending forwardly to the front end of the driving shaft 2 not shown in the drawings.

The gripping means for the drums 4, 4 preferably embody in their construction brake bands 9, 9 which surround said drums and are provided with brake linings 10 of suitable material which engage the exterior surface of said drums. Secured to one end of each of said brake bands is a bracket 11 having an elongated eye 12, the long diameter of which is radially disposed with respect to said brake drum, said eye being adapted to receive the end of a shaft 13 disposed with its axis substantially parallel with the axis of the rear axle and of each of the drums 4, 4, said shaft 13 extending from one end of the housing 2 to the other.

The elongated eye 12 of the bracket 11 is adapted to prevent a circumferential movement of said brake band on said drum, but permits said band to move radially of said drum so as to adjust itself properly with respect to said drum during the rotation of the same. The shaft 13 is journaled to rock in brackets 14 and 15 which are preferably respectively clamped to the radius rods 6 adjacent to opposite ends of the housing 2, said brackets being secured by plates 16 and screws 17, whereby said brackets may be adjusted to either new or old machines. The brackets 14 and 15 have bearing members 18 which receive the shaft 13, said bearing members being disposed at slight distances from the brackets 11, while the shaft 13 projects beyond said bearing members 18 these distances, and to said shaft, upon these projecting portions, are secured arms 19 and pivotally connected at 20 to the free end of each of the arms 19 is a link 21, in turn pivotally connected to one end of a lever 22. The opposite end of said lever 22 is pivoted at 23 upon the bracket 11.

Pivoted at a point 24 to the lever 22 intermediate of its ends is a link 25 screw threaded at 26 for a substantial portion of its length, the screw threaded portion being inserted through a hole 27 in a bracket 28 secured by rivets or other suitable means to the opposite end of the brake band 10 which terminates adjacent to the end to which the bracket 11 is secured.

A spring 29 encircles the link 25 between the bracket 27 and a shoulder 30 formed on said link and yieldingly separates the ends of the brake band 10. The tension of the spring 29 may be adjusted by means of a nut 31, engaging said link and the opposite face of the bracket 28 from that engaged by the spring 29, thus any wear developing from the use of the brake may be counteracted.

Motion is imparted to the shaft 13, preferably from the service brake pedal 32, shown in plan, Fig. 1 attached to the gear case 44 of the engine, a portion of said gear case being broken away to save space in the drawings.

Detachably secured to said pedal 32 is a clamp 33 having an eye 34 to which one end of an adjustable link 35 is connected. The opposite end of said link is attached to an arm 36 secured, in turn, to the shaft 13 intermediate of the bearing members 18, 18 of the brackets 14 and 15. The shaft 13 is supported adjacent to the arm 36, so as to prevent any undue deflection thereof, by an adjustable support or brace 37 having a bearing 38 detachably connected with said shaft, the opposite end of said support being detachably secured to the housing 2.

The portion of said support engaging said housing and that engaging said shaft 13 are in separate sections 39 and 40 respectively which have overlapping ends secured together by bolts 41. Slots 45, 45 in one of said sections permit said sections to be moved longitudinally with respect to each other when the brake mechanism is being adapted to the running gear of a motor vehicle.

It is essential that the brake band 10 be supported in such a manner that it will drag but very lightly upon the brake drum when the brake is not in use and to accomplish this result a lug 42 is attached to the brake band 10 on the opposite side of the housing 2 from that at which the shaft 13 is located and this lug engages a fixed arm 43 secured to the end of the housing 2 adjacent to the brake, one of these being provided for each brake band.

The general operation of the device hereinbefore specifically described is as follows:

Pressure is applied to the pedal to rock the same and the rocking movement thereof transmits, through the link 35 and arm 36, a rocking movement to the shaft 13 in the bearings 18. This rocking movement is further transmitted, through the arms 19, attached at opposite ends of said shaft, by means of links 21, to levers 22, and these levers coöperate to simultaneously contract, through the links 25, the brake bands 10 surrounding the drums 4, thereby producing a gripping action upon both drums at the same time.

Upon releasing the pressure on the pedal 32 the springs 29 act to separate the ends of the brake bands and thus release the drums. The arrangement of the several levers and links is such as to provide a very powerful action at a very small expenditure of energy on the pedal 32.

Furthermore, the construction of the various supporting members of the device render the attachment thereof to the vehicle very easy and not only to the particular type of vehicle described but to other types having parts suitable to support the brackets 14, 15 and 37.

Having thus specifically described my invention what I claim and desire by Letters Patent to secure is:

1. A brake mechanism having, in combination, a brake drum, a band adapted to engage said drum, a shaft, means for manually rocking said shaft, a bracket secured to one end of said band and engaging said shaft, adapted to prevent circumferential movement of said band, said bracket having a slot adapted to receive said shaft and permit a movement of said bracket relatively to said shaft radially of said drum, and means operatively connecting said shaft with the opposite end of said band, adapted to contract said band.

2. The combination with a pair of relatively rotatable drums, of a rear axle housing interposed between said drums, a shaft extending longitudinally of said rear axle housing, brackets for said shaft detachably arranged adjacent to opposite ends of said rear axle housing, bands adapted to engage said drums, a support for said shaft interposed between said brackets and adjustable radially of said rear axle housing, means operatively connecting said shaft with said band, and means attached to said shaft adjacent to said support, adapted to impart a rocking movement to said shaft.

3. A brake mechanism having, in combination, a pair of drums, a brake band engaging each of said drums, a shaft extending from one of said drums to the other, means for rocking said shaft, means on each of said bands adapted to engage the adjacent ends of said shaft to prevent circumferential movement of said bands on said drums, an arm secured to each end of said shaft, levers attached respectively to the ends of said bands which have connection with said shaft, links interposed between said arms and said levers, and adjustable links connecting said levers respectively with the free ends of said bands.

In testimony whereof I have hereunto set my hand in presence of two subscribing witnesses.

RUDOLF PAULSON.

Witnesses:
SYDNEY E. TAFT,
LEONARD A. POWELL.